US008903886B2

(12) United States Patent
Masuda

(10) Patent No.: US 8,903,886 B2
(45) Date of Patent: Dec. 2, 2014

(54) METHOD, APPARATUS, AND COMPUTER PROGRAM PRODUCT FOR PROCESSING WORKFLOW

(75) Inventor: Masaya Masuda, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 129 days.

(21) Appl. No.: 13/540,682

(22) Filed: Jul. 3, 2012

(65) Prior Publication Data

US 2013/0013662 A1    Jan. 10, 2013

(30) Foreign Application Priority Data

Jul. 8, 2011    (JP) .................................. 2011-151490

(51) Int. Cl.
*G06F 15/16* (2006.01)
*G06F 9/50* (2006.01)
*G06F 3/12* (2006.01)
*G06Q 10/06* (2012.01)

(52) U.S. Cl.
CPC ............ *G06F 9/5038* (2013.01); *G06F 3/1285* (2013.01); *G06F 3/1288* (2013.01); *G06F 3/1296* (2013.01); *G06Q 10/06* (2013.01)
USPC .............................. 709/201; 709/205; 358/1.1

(58) Field of Classification Search
CPC ... G06F 3/1296; G06F 3/1285; G06F 3/1288; G06Q 10/06
USPC ................. 709/201–202, 205, 217–219, 220; 358/1.1, 1.13, 1.15
See application file for complete search history.

(56) References Cited

U.S. PATENT DOCUMENTS

| 7,243,146 | B2* | 7/2007 | White et al. ................... 709/224 |
| 7,827,563 | B2* | 11/2010 | Westervelt et al. ........... 719/315 |
| 7,975,106 | B2* | 7/2011 | Corona ......................... 711/115 |
| 8,130,951 | B2* | 3/2012 | Tian ................................ 380/51 |
| 2003/0079006 | A1* | 4/2003 | White et al. ................... 709/223 |
| 2009/0282193 | A1* | 11/2009 | Corona ......................... 711/115 |
| 2010/0103456 | A1 | 4/2010 | Masuda |
| 2010/0153581 | A1* | 6/2010 | Nagarajan et al. ............ 709/238 |
| 2011/0023024 | A1 | 1/2011 | Masuda |
| 2011/0304891 | A1 | 12/2011 | Masuda |

FOREIGN PATENT DOCUMENTS

| JP | 2010198316 A | 9/2010 |
| JP | 2010238218 A | 10/2010 |
| JP | 2011-044946 A | 3/2011 |
| JP | 4925969 | 2/2012 |

* cited by examiner

*Primary Examiner* — Moustafa M Meky
(74) *Attorney, Agent, or Firm* — Harness, Dickey & Pierce

(57) ABSTRACT

In an embodiment, a workflow processing apparatus is connected to a network and obtains a file over the network. The workflow processing apparatus includes: a file analyzing unit, a workflow selecting unit, and a workflow processing unit. The file analyzing that extracts information for use in classification of the file from a file name assigned to the file as bibliographic data and stores the bibliographic data as being associated with the file in a temporary storage area. The workflow selecting unit obtains the file and the bibliographic data stored in the temporary storage area, determines an operation to be performed according to the bibliographic data, and selects a workflow for performing the determined operation from preset multiple workflows. The workflow processing unit processes the file according to the selected workflow.

12 Claims, 7 Drawing Sheets

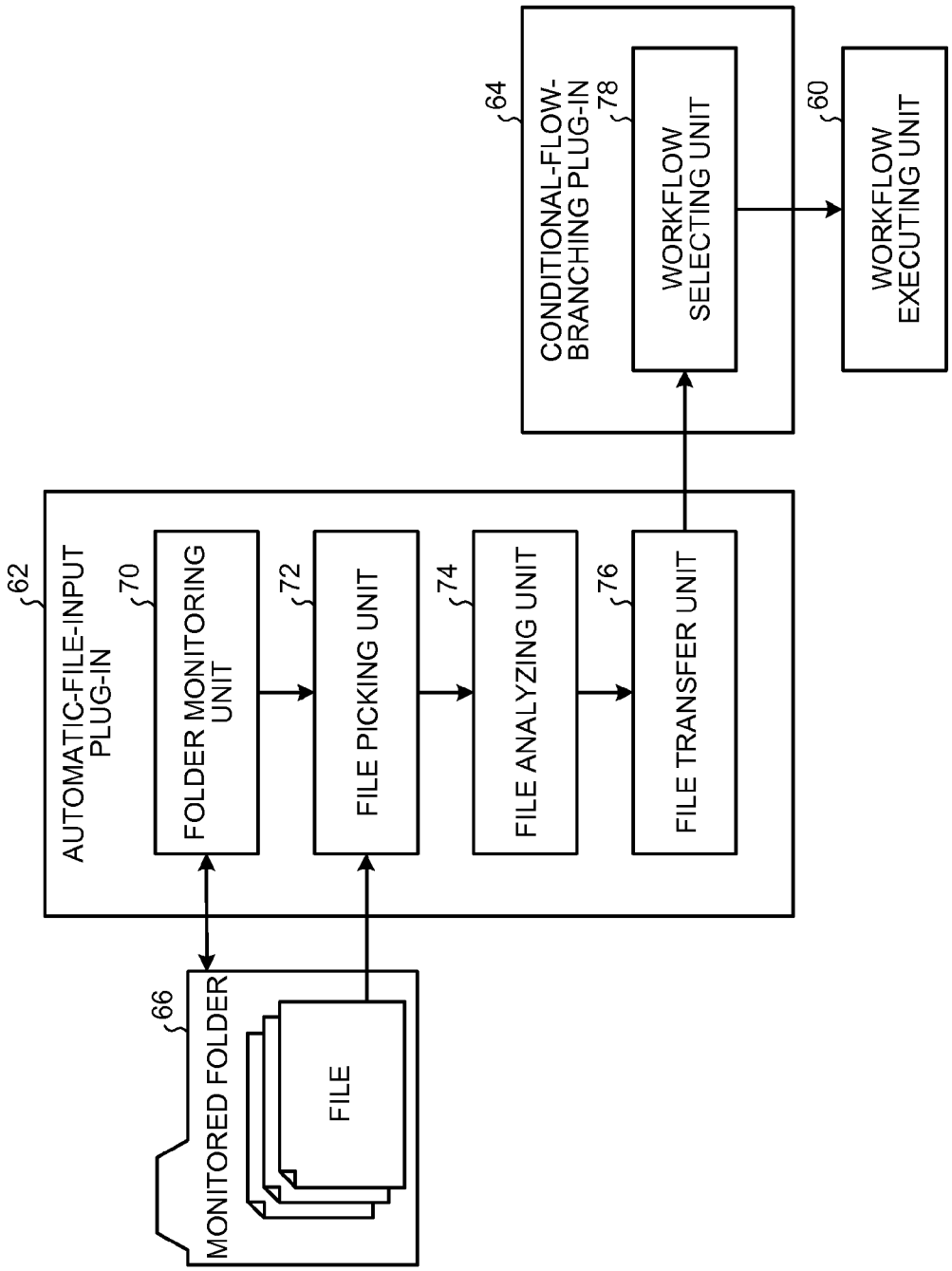

FIG.5

```xml
<?xml version="1.0" encoding="UTF-8" ?>
- <document>
  - <properties>
    - <basic>
      - <property id="transferKind">
          <value>delivery</value>
        </property>
      - <property id="application">
          <value>scan</value>
        </property>
      - <property id="mfpApplicationVer">
          <value>1.3.5.0</value>
        </property>
      - <property id="scanPageCount">
          <value>1</value>
        </property>
      - <property id="sourceTimeZone">
          <value>GMT+09:00</value>
        </property>
      - <property id="yResolution">
          <value>200</value>
        </property>
      - <property id="width">
          <value>1656</value>
        </property>
      - <property id="TSI">
          <value>Company A</value>
        </property>
      - <property id="contentType">
          <value>TIFF</value>
        </property>
      </basic>
    - <resultURL>
      - <property id="scanToFolder">
          <value>http://123/20071206220708.tif</value>
        </property>
      </resultURL>
    </properties>
  </document>
```

WORKFLOW 1a

WORKFLOW 1b

WORKFLOW 1c

WORKFLOW 1d

METHOD, APPARATUS, AND COMPUTER PROGRAM PRODUCT FOR PROCESSING WORKFLOW

CROSS-REFERENCE TO RELATED APPLICATIONS

The present application claims priority to and incorporates by reference the entire contents of Japanese Patent Application No. 2011-151490 filed in Japan on Jul. 8, 2011.

BACKGROUND OF THE INVENTION

1. Field of the Invention

The embodiments relate to a workflow processing apparatus that processes a file obtained over a network according to a workflow, a processing method therefor, and a computer program product for performing the method.

2. Description of the Related Art

Document delivery systems that cause an image input apparatus such as a scanner apparatus or a multifunction peripheral (MFP) to coordinate with an information processing apparatus such as a server to thereby digitize and/or deliver paper documents efficiently have been provided and come into widespread use.

As an example of such a system, a document delivery system including an MFP and a delivery server is disclosed in Japanese Patent Application Laid-open No. 2008-097586. In this document delivery system, the delivery server associates received bibliographic data with workflow (hereinafter, sometimes referred to as "flow") definition data and controls one or more operations which can be image conversion, e-mail delivery, delivery-to-folder, and the like on scanned image data based on the flow definition data associated with the bibliographic data, thereby implementing a document delivery workflow according to the received bibliographic data.

Providing such a document delivery system can lead to efficient processing. However, constructing this system requires not only an addition of a delivery server but also a premise that the image input apparatus such as an MFP should support this system. More specifically, it is necessary for the image input apparatus to be capable of communicating with the delivery server and selecting a predetermined document delivery workflow and to have a scanner-purpose application to provide scanned image data to the document delivery workflow so that the image input apparatus can utilize a document delivery function provided by the delivery server.

In view of the circumstance, proposed in Japanese Patent Application Laid-open No. 2010-238218 is a system that permits utilizing the document delivery function even when a special application is not installed. This system includes an image processing apparatus that corresponds to the delivery server in the above description. When image data is obtained from an image input apparatus and stored in a predetermined folder (monitoring folder) on a file system, the image processing apparatus detects that the image data is newly stored in the folder. This is because the predetermined folder is monitored as to whether image data is newly stored in the predetermined folder by polling. The image processing apparatus determines whether the image data is image data from a valid delivery source. When determining that the image data is from a valid delivery source, the image processing apparatus performs image conversion, e-mail delivery, delivery-to-folder, and/or the like using a preset delivery workflow.

Thus, an operator is required just simply to transmit image data to a storage location of a monitoring subject associated with desired flow definition data; in response thereto, the image processing apparatus can detect that the image data is newly stored in the storage location and perform operations according to the desired flow definition data on the image data.

The conventional image processing apparatus can perform operations according to preset desired flow definition data. However, the image processing apparatus cannot dynamically change the flow definition data to perform operations according to the changed flow definition data. Put another way, the conventional image processing apparatus cannot change flow definition data according to information about a kind, a name, and/or the like of data to be delivered by accessing the information.

As a method for dynamically changing a delivery workflow, additional information can be embedded in data to be delivered. This addition can be performed by extending the data and embedding a barcode in the data, for example. However, this method disadvantageously presents difficulty to a user in implementing the method because the extension of data is not easy.

As a method that does not involve the extension of data, can be used a method of causing a document to be delivered to have a cover page that includes optical mark recognition (OMR) or a barcode. However, this method is disadvantageously troublesome because the OMR or the barcode is of a special form for easy recognition and therefore requires use of special means for the recognition each time when necessity arises.

SUMMARY OF THE INVENTION

It is an object of the present invention to at least partially solve the problems in the conventional technology.

In an embodiment, a workflow processing apparatus is connected to a network and obtains a file over the network. The workflow processing apparatus includes: a file analyzing unit, a workflow selecting unit, and a workflow processing unit. The file analyzing that extracts information for use in classification of the file from a file name assigned to the file as bibliographic data and stores the bibliographic data as being associated with the file in a temporary storage area. The workflow selecting unit obtains the file and the bibliographic data stored in the temporary storage area, determines an operation to be performed according to the bibliographic data, and selects a workflow for performing the determined operation from preset multiple workflows. The workflow processing unit processes the file according to the selected workflow.

In another embodiment, it is provided a processing method to be performed by a workflow processing apparatus connected to a network and obtains a file over the network. The processing method includes: file-analyzing that includes extracting information for use in classification of the file from a file name assigned to the file as bibliographic data and storing the bibliographic data as being associated with the file in a temporary storage area; selecting that includes obtaining the file and the bibliographic data stored in the temporary storage area, determining an operation to be performed according to the bibliographic data, and selecting a workflow for performing the determined operation from preset multiple workflows; and workflow-processing that includes processing the file according to the selected workflow.

In further embodiment, it is provided a computer program product that includes a non-transitory computer-usable medium having computer-readable program codes embodied in the medium for a workflow processing method for a workflow processing apparatus connected to a network and obtains a file over the network. The program codes when executed causing a computer to execute the method described above.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a functional block diagram of the workflow processing apparatus according to the embodiment;

FIG. 5 is a diagram illustrating document information described in an XML format as an example of bibliographic data;

FIGS. 7A to 7D are diagrams illustrating examples of a workflow that is to be changed depending on a file type or the like.

DETAILED DESCRIPTION OF THE PREFERRED EMBODIMENTS

Figure 1:
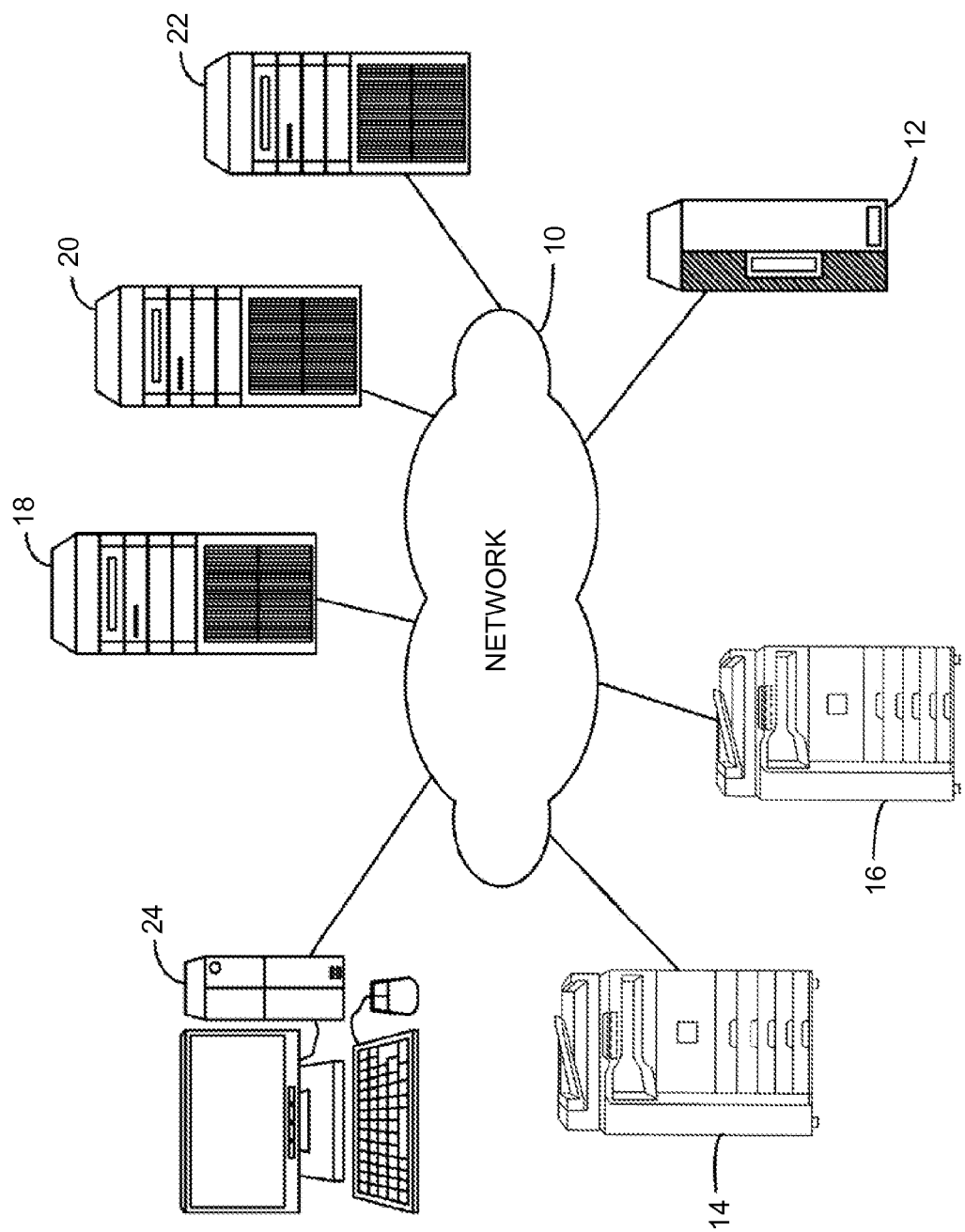
FIG. 1 is a diagram illustrating a network environment including a workflow processing apparatus according to an embodiment.

FIG. 1 is a diagram illustrating a network environment including a workflow processing apparatus according to an embodiment. The network environment illustrated in FIG. 1 includes a workflow processing apparatus 12 and a plurality of MFPs, more specifically, MFPs 14 and 16, connected to one another over a network 10. Referring to FIG. 1, the workflow processing apparatus 12 can communicate with a file transfer protocol (FTP) server 18, a web-based distributed authoring and versioning (WebDAV) server 20, a simple mail transfer protocol (SMTP) server 22, and a PC 24 over the network 10.

The network 10 can be configured as a local area network (LAN) or a virtual private network (VPN) using a transaction protocol, such as Ethernet (registered trademark) or transmission control protocol/internet protocol (TCP/IP), or a wide area network (WAN) connected using a private line or the like. The network 10 is not limited to these configurations, and may include the Internet connected via a router. The network 10 can be any one of a wired network, a wireless network, and a combination of them.

Each of the MFPs 14 and 16 (hereinafter, "MFP 14, 16") has a scanner function and a facsimile function. The MFP 14, 16 can scan a document image, generate image data, and input the image data to the workflow processing apparatus 12; accordingly, the MFP 14, 16 can function as an image input apparatus. After generating image data, the MFP 14, 16 creates a file from the image data by adding bibliographic data to the image data as appropriate, and inputs the file to the workflow processing apparatus 12. The image data to be generated can be of an image format of various types, e.g., BMP, TIFF, GIF, JPEG, or RAW. The bibliographic data can be configured as a file, which is separate from the image data, described in a structured language such as XML and containing attributes of creation date and time, resolution, document name of the data, and/or the like.

The MFP 14, 16 can utilize the function of the workflow processing apparatus 12 described above by using a general-purpose protocol such as FTP, server message block (SMB), network file system (NFS), or the like data-sharing protocol.

The FTP server 18 is a server that transmits and receives files using FTP and generally used to transfer large-volume files. The FTP server 18 is used to transfer files to a web server, for example. The WebDAV server 20 is also a server that transmits and receives files. In contrast to the FTP server 18, the WebDAV server 20 is based on hypertext transfer protocol (HTTP) and performs content management using only HTTP. The WebDAV server 20 can also perform encrypted communications using secure socket layer (SSL) or the like. These functions can be utilized in performing delivery-to-folder to a designated folder.

The SMTP server 22 can be used when performing e-mail delivery and web delivery. The PC 24 transmits such a file transfer request as described above, receives a file read out from a designated folder, and performs various processing on the received file. The PC 24 can also perform an image conversion operation and/or the like.

The workflow processing apparatus 12 obtains a file from the MFP 14, 16 or the PC 24, selects one workflow from preset multiple workflows, and processes the file according to the selected workflow. Examples of operations to be defined in the workflow include an image conversion operation such as format conversion of image data, a delivery-to-folder operation to be performed by the FTP server 18 or the WebDAV server 20, an e-mail delivery operation and a web delivery operation to be performed by the SMTP server 22, a printing operation of printing data of the PC 24 by the MFP 14, 16, and a file transfer operation to be performed by the PC 24. Other examples include a logging operation and image processing such as image correction and image retouching.

Although not shown in FIG. 1, a management terminal may be connected to the network 10 so that various settings of the workflow processing apparatus 12 can be made using the management terminal. Alternatively, the workflow processing apparatus 12 can include its own input device and display device. In this case, the various settings can be made using these devices.

A hardware structure of the MFP 14, 16 is briefly described below. The MFP 14, 16 includes a controller, an operation panel, a facsimile control unit (FCU), and an engine unit. The controller includes a CPU, a north bridge (NB), an application-specific integrated circuit (ASIC) connected to the CPU via the NB, and a system memory for use as a rendering memory.

The ASIC is connected to a nonvolatile memory such as a local memory, a hard disk drive (HDD), and/or a flash memory. The local memory is used as an image buffer for copying and as a code buffer. The HDD stores not only image data and document data but also programs, font data, and the like. The flash memory stores programs for controlling the MFP 14, 16, various system information, and various setting information.

The controller further includes a south bridge (SB), a network interface card (NIC), a secure digital (SD) card slot, a universal serial bus (USB) interface, an IEEE 1394 interface, and a Centronics interface. These are connected to the NB via a peripheral component interconnect (PCI) bus. The SB is a bridge for connecting the NB to a read only memory (ROM), PCI-bus peripheral devices, and the like. The NIC is an interface (I/F) for connecting the MFP 14, 16 to a network such as the Internet or a LAN. The SD card slot allows removable mounting of an SD card. Each of the USB I/F, the IEEE 1394 I/F, and the Centronics I/F is an I/F conforming to a corresponding standard and receives a print job and the like via the I/F.

The operation panel is connected to the ASIC of the controller and provides a user interface (UI) to receive an input from a user and perform image display for the user. The FCU and the engine unit are connected to the ASIC via the PCI bus. The FCU performs a communication method according to a facsimile communication protocol such as the Group 3 (G3) or Group 4 (G4) protocol. The engine unit performs an image forming operation or an image scanning operation in response to receipt of a printing instruction or a scanning instruction issued by an application.

The MFP 14, 16 can perform each operation under control of an appropriate operating system (OS) in a manner such that the CPU reads out a program from a storage device such as the flash memory, the HDD, or the SD card and loads the program in a memory area in the system memory or the like. As the OS, an OS of any architecture can be employed. Examples of the OS include Windows (registered trademark), UNIX (registered trademark), and Linux (registered trademark).

Figure 2:
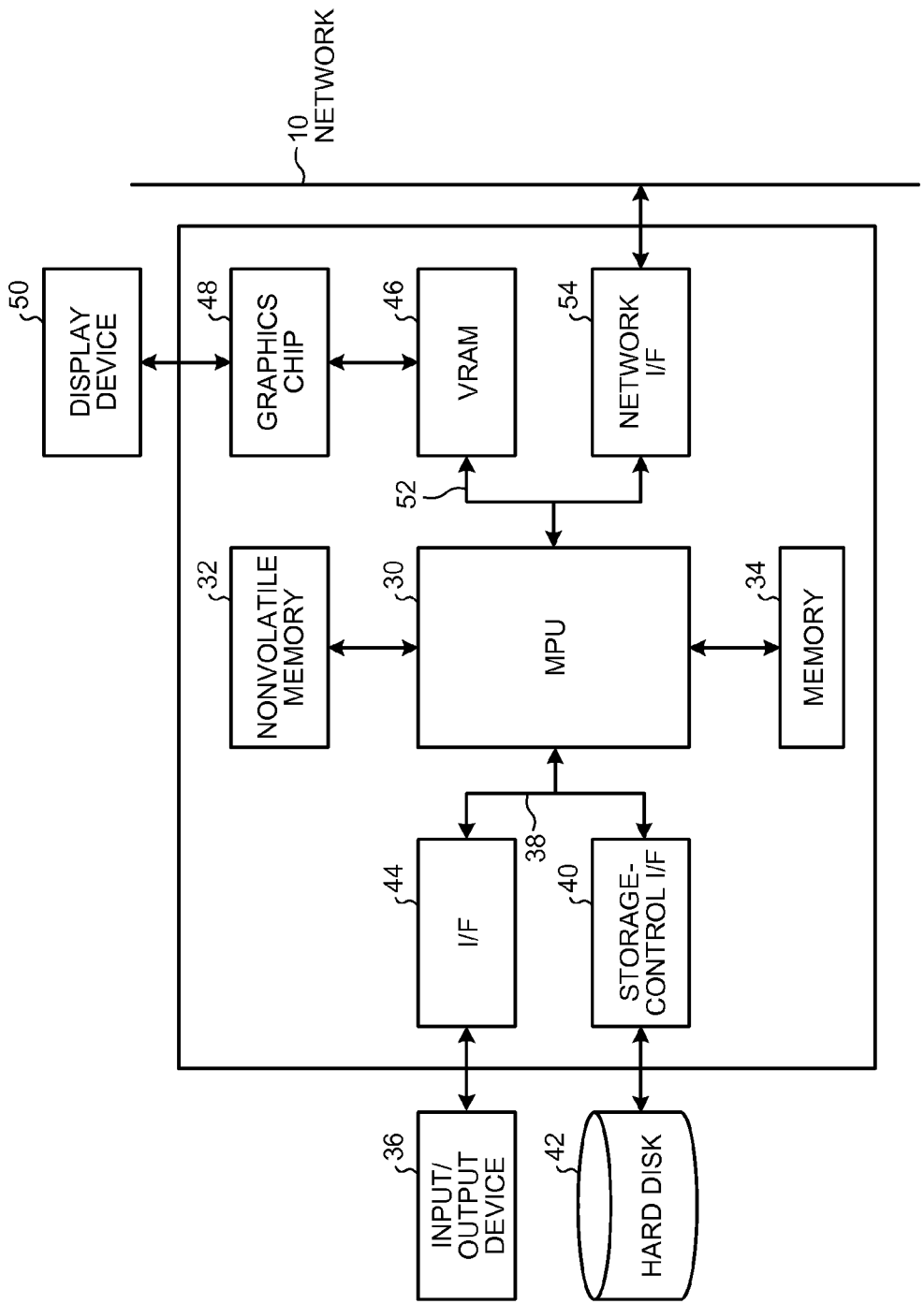
FIG. 2 is a diagram illustrating a hardware structure of the workflow processing apparatus according to the embodiment.

A hardware structure of the workflow processing apparatus 12 is described below with reference to FIG. 2. The workflow processing apparatus 12 includes a microprocessor unit (MPU) 30, a nonvolatile memory 32 that stores basic input output system (BIOS), and a memory 34 which is a random access memory (RAM) or the like that provides processing memory space for enabling program execution by the MPU 30. The MPU 30 reads out the BIOS from the nonvolatile memory 32 at startup to perform system diagnosis and manages an input/output device 36.

The MPU 30 is connected to a storage-control I/F 40 via an internal bus 38. Data writing to or reading from a hard disk 42 is performed in response to an input/output request from the MPU 30. Employable as the storage-control I/F 40 is an I/F that manages input/output to and from the hard disk 42 according to the integrated device electronic (IDE), advanced technology attachment (ATA), Serial ATA, Ultra-ATA, or the like standard. The MPU 30 controls a serial or parallel I/F 44 such as a USB I/F or an IEEE 1164 I/F via the internal bus 38 to communicate with the input/output device 36, such as a keyboard, a mouse, or a printer, to receive an input from an user.

The workflow processing apparatus 12 further includes a video RAM (VRAM) 46 and a graphics chip 48. The workflow processing apparatus 12 can process video signals and cause the processed video signals to be displayed on a display device 50 in response to an instruction from the MPU 30. The MPU 30 communicates with a network I/F 54 via an internal bus 52, thereby enabling the workflow processing apparatus 12 to communicate with the MFP 14, 16 and the PC 24 over the network 10.

The workflow processing apparatus 12 performs a function of executing a workflow, which will be described later, and other operations under control of an appropriate OS in a manner such that the MPU 30 reads out a program stored in a storage device such as the nonvolatile memory 32 or the hard disk 42 and loads the program in a memory area in the memory 34 as in the MFP 14, 16.

The PC 24 can employ a hardware structure similar to that of the workflow processing apparatus 12. When the PC 24 includes a management terminal, the management terminal can also have a hardware structure similar to that of the workflow processing apparatus 12.

Figure 3:
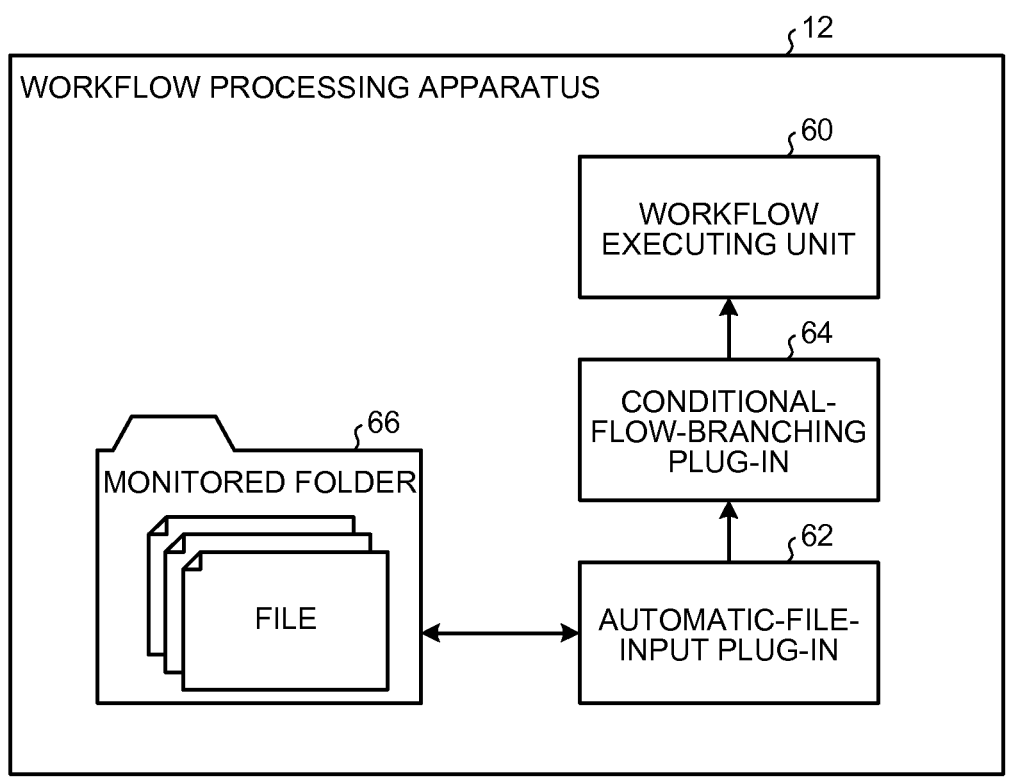
FIG. 3 is a diagram illustrating a software configuration of the workflow processing apparatus according to the embodiment.

FIG. 3 is a diagram schematically illustrating functions and a software configuration of the workflow processing apparatus 12. As illustrated in FIG. 3, the workflow processing apparatus 12 includes a workflow processing unit 60 as a function part, and also includes an automatic-file-input plug-in 62 and a conditional-flow-branching plug-in 64 as software. The workflow processing apparatus 12 also includes a monitoring subject folder (monitored folder) 66 to be monitored by the automatic-file-input plug-in 62. The monitored folder 66, which is a storage area designated in advance, is designated for use by the image input apparatus described above to store document data. The monitored folder 66 is not necessarily a single folder, and multiple monitored folders 66 may be provided.

For instance, a user makes settings for a scanning operation from the operation panel of the MFP 14 when the user desires to scan an image with the MFP 14, perform PDF conversion of the scanned image data, and perform delivery-to-folder to store the image data. The settings for the scanning operation are made by designating a transfer destination of the image data, inputting bibliographic data, and designating various scanning conditions. When these designation and input are completed and a start key on the operation panel is pressed, a scanner section of the MFP 14 performs image scanning and outputs image data. The output image data is transferred to the designated transfer destination.

The specific monitored folder 66 is designated as the transfer destination so that a workflow that performs a PDF conversion operation and a delivery-to-folder operation is executed in subsequent processing. Accordingly, the image data is transferred to the monitored folder 66 as a file that contains the image data and the bibliographic data and stored in the monitored folder 66. In a situation where there are the multiple monitored folders 66, workflows are associated on a monitored-folder-by-monitored-folder basis. The workflow processing apparatus 12 can perform management using an association table in which monitored folder names for identifying the monitored folders 66 and workflow names for identifying the workflows are associated with each other.

The workflow processing unit 60 processes the file according to a workflow associated with the monitored folder 66 to execute the workflow. In the example described above, the workflow is defined so as to perform the PDF conversion operation and the delivery-to-folder operation in this order. Hence, the workflow processing unit 60 performs the PDF conversion operation on the image data of the input file first. Thereafter, the workflow processing unit 60 requests the FTP server 18 or the like to perform the delivery-to-folder to a folder in which the processed data is to be stored and store the data in the folder.

The image conversion operation can be performed by executing an image conversion program of the workflow processing apparatus 12. Alternatively, it is possible to request the PC 24 or the like to perform the image conversion operation. The delivery-to-folder operation can be performed by requesting the FTP server 18 or the WebDAV server 20 to perform the delivery-to-folder operation. Mail delivery or web delivery can be performed by requesting the SMTP server 22 to perform the delivery. A printing operation can be performed by requesting the MFP 14, 16 to perform the printing operation.

Nevertheless, the workflow processing apparatus 12 includes the automatic-file-input plug-in 62 and the conditional-flow-branching plug-in 64. Accordingly, the workflow processing unit 60 executes the workflow associated with the monitored folder 66 as is rather than sending the request described above. The workflow processing unit 60 analyzes a file name of the file stored in the monitored folder 66, changes the workflow dynamically by selecting a workflow according to a result of the analysis, and processes the file according to the selected workflow.

Thus, the workflow can be dynamically changed by accessing information about the file when the workflow is actually executed rather than when the workflow is created. Furthermore, such processing as described above is achievable easily only by adding the two plug-ins.

The functions provided by the automatic-file-input plug-in 62 and the conditional-flow-branching plug-in 64 are described in detail below with reference to FIG. 4. The automatic-file-input plug-in 62 is implemented via an application executed by the MPU 30 of the workflow processing apparatus 12. The automatic-file-input plug-in 62 functions as a folder monitoring unit 70, a file picking unit 72, a file analyzing unit 74, and a file transfer unit 76. For convenience of description, the automatic-file-input plug-in 62 is depicted in FIG. 4 as containing these sections, and the conditional-flow-branching plug-in 64 is depicted as containing a workflow selecting unit 78, which will be described later.

The folder monitoring unit 70 polls the monitored folder 66, in which the file is to be stored, at predetermined time intervals to determine whether the monitored folder 66 contains a file. Put another way, the folder monitoring unit 70 addresses inquires to the monitored folder 66 at the time intervals having been set as desired, thereby determining whether the monitored folder 66 contains a file. File detection in the monitored folder 66 occurs in a situation where a file is newly stored in the monitored folder 66. When it is determined that the monitored folder 66 contains a file, the folder monitoring unit 70 notifies the file picking unit 72 that the monitored folder 66 contains the file.

Upon receiving the notification, the file picking unit 72 generates a copy of the file stored in the monitored folder 66, causes the copy to be stored in a temporary storage area (not shown) belonging to the automatic-file-input plug-in 62, and deletes the file stored in the monitored folder 66. The file picking unit 72 picks the file stored in the monitored folder 66 by performing such processing as described above. The temporary storage area is a storage area for temporarily storing the file. A memory area of a predetermined size allocated in the memory 34, which is the RAM or the like, can be used as the temporary storage area.

In response to that the file is stored in the temporary storage area, the file analyzing unit 74 extracts information for use in classification of the file from a file name assigned to the file as bibliographic data. The file name contains delivery-source identifying information for identifying a delivery source, data-class identifying information for identifying a data class, and a type of the file, for example.

More specifically, the file name contains a name of the delivery source, a data-class identifier, and an extension indicating the file type, and takes a form of: "nnn_ccc.eee", where nnn is the name of the delivery source, ccc is the data-class identifier, and eee is the extension, for example. The delivery source name in the file name can be a character string of a name of a delivery source company. The data-class identifier can be an integer (0, 1, 2, . . . ) and assigned in a manner such that: 1 indicates a received order sheet, 2 indicates an ordering sheet, 3 indicates monthly sales data, and 0 indicates others, for example. The extension can be bmp, tif, gif, pdf or the like that depends on the file type.

The file analyzing unit 74 extracts the bibliographic data including, e.g., the delivery-source identifying information, the data-class identifying information, and the file type, and thereafter stores the bibliographic data as being associated with the file stored in the temporary storage area. The file analyzing unit 74 can cause only the extracted bibliographic data to be stored in the temporary storage area. Meanwhile, the bibliographic data can include attributes such as creation date and time, resolution, and document name of the file. Accordingly, the file analyzing unit 74 can cause such bibliographic data containing these attributes to be stored. The bibliographic data can be configured as a file described in a structured language such as XML. FIG. 5 illustrates document information which is an example of the bibliographic data.

FIG. 5 is a diagram illustrating the document information described in an XML format as an example of the bibliographic data. In FIG. 5, <document> element indicates a root element of the document information, i.e., an uppermost element in a tree structure. Contained in <properties> element are all of <property> elements and <resultURL> elements.

Placed between <basic> and </basic> tags of <basic> element are basic document information items and custom document information items. An item name of each of the document information items is set as "id" attribute in <property id> tag of the document information item. A value associated with each of the document information items is placed between <value> and </value> tags. FIG. 5 illustrates the example in which an application, a version of the application, resolution, and the like and their values are set in the basic document information items. These information pieces can be obtained from the bibliographic data that is input when setting for the scanning operation is made or the like.

The document information illustrated in FIG. 5 contains "TSI" as an item name of one of the custom document information items, "Company A" as a value associated with "TSI", "contentType" as an item name of another custom document information item, and "TIFF" as a value of "contentType". "TSI" which can be a name of the delivery source, a telephone number of the same, or the like is used to specify the name of the delivery source company. "contentType" indicates a type of multipurpose internet mail extensions (MIME) and is used to specify a data class of the file. MIME is a standard for allowing images, audio, videos, and languages of different countries to be transferred as contents of e-mail messages exchanged over TCP/IP network. These information pieces are extracted from the file name.

In the document information, <resultURL> element follows <basic> element described above. Placed between <resultURL> and </resultURL> tags of <resultURL> element is an uniform resource locator (URL) of a storage location where the file is to be stored. The storage location in this example is "http://123/20071206220708.tif". An address of a folder that is determined based on information extracted from the file name is input as this storage location.

For example, the workflow processing apparatus 12 can hold an address association table that contains folder names of folders, which are storage locations, and addresses of the folders associated with each other. The workflow processing apparatus 12 can obtain an address associated with a folder name of the determined folder using this address association table and input the address to <resultURL> element of the document information.

Data classes can be formulated, for instance, in a manner such that data of which "contentType" is "TIFF" is classified as "class 1", data of which "contentType" is "GIF" is classified as "class 2", data of which "contentType" is "PDF" is classified as "class 3", and data of which "contentType" is other than these is classified as "others". As in the case described above, it can be assumed that class 1 indicates a received order sheet, class 2 indicates an ordering sheet, class 3 indicates monthly sales data.

According to the document information illustrated in FIG. 5, "TSI" is "Company A", the MIME type is "TIFF", and the data class to "class 1". The conditional-flow-branching plug-in 64 illustrated in FIG. 3 is executed to function as the workflow selecting unit 78 based on these information pieces. For instance, the workflow selecting unit 78 determines PDF conversion and delivery-to-folder to a folder for received order sheets of Company A as operations to be performed, and selects one workflow from preset multiple workflows so that the determined operations are performed.

More specifically, a workflow is associated with the monitored folder 66. The workflow is defined so as to perform the PDF conversion operation and the delivery-to-folder operation in this order, for example. The delivery-source identifying information in the document information received by the workflow selecting unit 78 is Company A. Accordingly, the workflow selecting unit 78 determines that the delivery-to-folder is to be performed to a folder of Company A. Furthermore, the data-class identifying information in the document information is class 1, which indicates a received order sheet. Accordingly, the workflow selecting unit 78 determines that the delivery-to-folder is to be performed to a folder for received order sheets among folders of Company A. Furthermore, the file is image data of TIFF rather than PDF. Accordingly, the workflow selecting unit 78 determines that the PDF conversion operation is to be performed. The workflow selecting unit 78 determines that the PDF conversion and the delivery-to-folder to the folder for received order sheets for Company A are the operations to be performed in this way.

A workflow can be defined by, for example, parameters for identifying operations to be performed and an order in which the operations are performed. Accordingly, the workflow selecting unit 78 can select a workflow in which a parameter for performing the PDF conversion and a parameter for performing the deliver-to-folder to the folder for received order sheets of Company A are arranged in this order from the preset multiple workflows.

The workflow processing unit 60 receives workflow identifying information for identifying the workflow selected by the workflow selecting unit 78, and the file and the bibliographic data received by the workflow selecting unit 78 from the file transfer unit 76, and processes the file according to the workflow identified by the workflow identifying information. In this example, the workflow processing unit 60 performs the PDF conversion, and thereafter requests the FTP server 18 or the like to perform the delivery-to-folder to the folder for received order sheets of Company A. The FTP server 18 or the like obtains information about the storage location of the file from the bibliographic data, delivers the file to the storage location, and causes the file to be stored in the storage location.

The operations to be performed by the sections described above can be configured as a computer-readable program. It is possible to provide this program. Accordingly, it is possible to cause a computer on which this program is installed to function as the workflow processing apparatus 12. This program can be provided as being stored in a recording medium, such as a flexible disk, a CD-ROM, a DVD, or an SD card. The program can be stored in a server apparatus, a PC, or the like connected to the network 10 so as to be provided by downloading.

Figure 6:
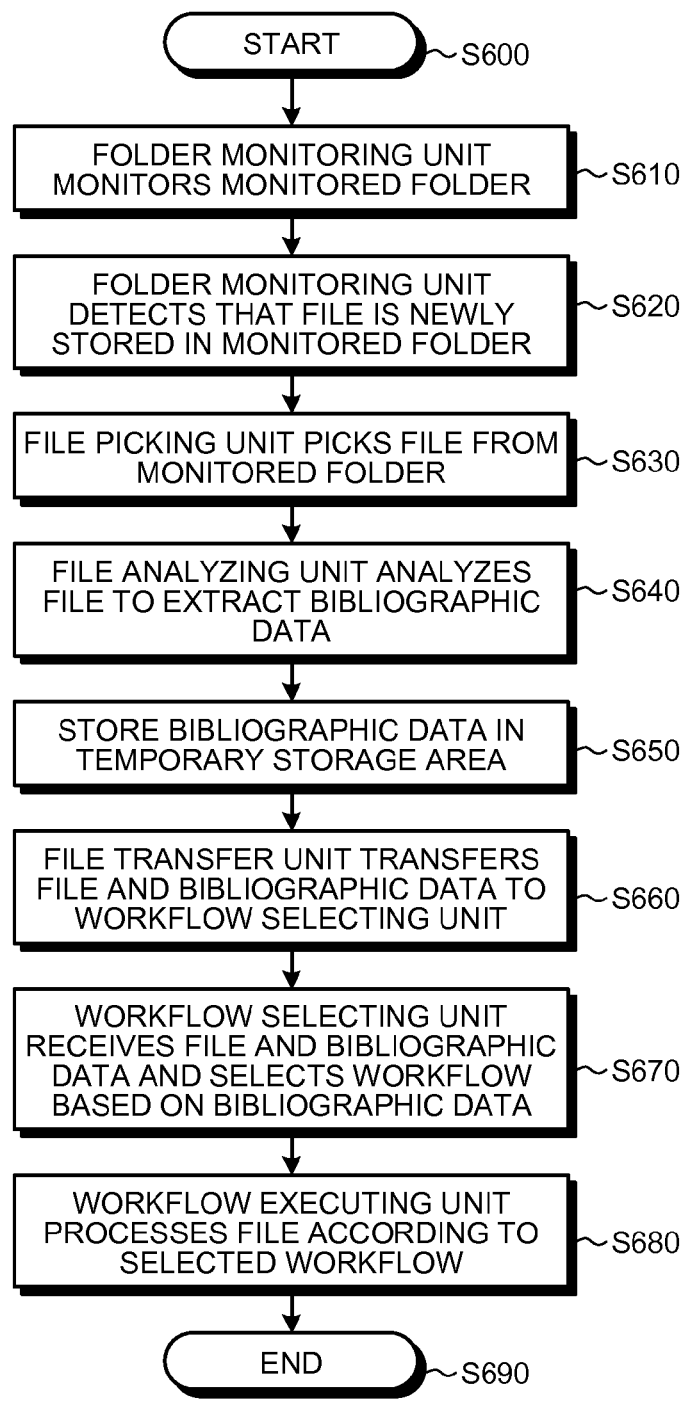
FIG. 6 is a flowchart illustrating a sequence of operations to be performed by the workflow processing apparatus.

A sequence of operations to be performed by the workflow processing apparatus 12 is described below with reference to the flowchart illustrated in FIG. 6. The workflow processing apparatus 12 starts processing from Step S600. The folder monitoring unit 70 monitors whether a file is stored in the monitored folder 66 at regular time intervals (Step S610). The image input apparatus designates the monitored folder 66. When a file has been stored in the monitored folder 66, the folder monitoring unit 70 detects that the monitored folder 66 contains the file (Step S620). Upon this detection, the folder monitoring unit 70 notifies the file picking unit 72 that the monitored folder 66 contains the file. When the monitored folder 66 contains two or more files, information for identifying the files are also sent with the notification. The information can be file names, for example.

Upon receiving the notification, the file picking unit 72 accesses the monitored folder 66 to confirm that the monitored folder 66 contains the file as indicated by the notification, and creates a copy of the file (Step S630). The file picking unit 72 stores the copy of the file in the temporary storage area belonging to the automatic-file-input plug-in 62 and deletes the file stored in the monitored folder 66. The file picking unit 72 picks the file stored in the monitored folder 66 in this way.

When the file has been stored in the temporary storage area, the file analyzing unit 74 analyzes a file name assigned to the file to determine a delivery source and a data class and determine a type of the file from an extension of the file, and extracts these information pieces (Step S640). The file analyzing unit 74 stores the extracted information pieces as being associated with the file in the temporary storage area as the bibliographic data (Step S650).

When the bibliographic data has been stored, the file transfer unit 76 transfers the file and the bibliographic data from the temporary storage area to the workflow selecting unit 78 provided by execution of the conditional-flow-branching plug-in 64 (Step S660).

The workflow selecting unit 78 obtains values of "TSI" and "contentType" of such document information as illustrated in FIG. 5 as the bibliographic data, and determines an operation(s) to be performed from the delivery source name and the file type indicated by the values (Step S670). When the delivery source name is Company A and the file type is TIFF, the data class of the file is 1. In this case, the workflow selecting unit 78 determines that the operations to be performed are the PDF conversion and the delivery-to-folder to the folder for received order sheets for Company A as described above, for example.

Subsequently, the workflow selecting unit 78 selects a workflow defined so as to perform the PDF conversion and the deliver-to-folder to the folder for received order sheets of Company A in this order. Meanwhile, a workflow name serving as workflow identifying information for identifying a workflow is assigned to each workflow. Accordingly, the workflow selecting unit 78 inputs a workflow name of the selected workflow, the file, and the bibliographic data to the workflow processing unit 60.

Figure 7A:
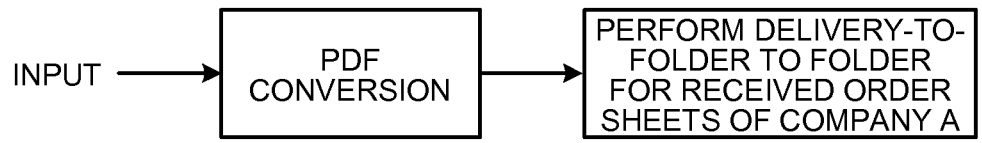

FIGS. 7A to 7D illustrate examples of the workflow. FIG. 7A illustrates a workflow named as a workflow 1a that is to be selected for image data of which bibliographic information indicates that delivery source name is Company A and data class is 1. According to the workflow 1a, PDF conversion is performed first, and then delivery-to-folder to the folder for received order sheets of Company A is performed.

Figure 7B:
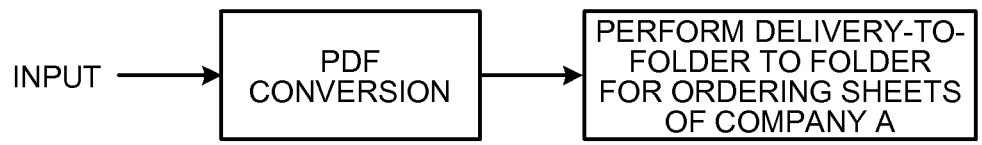

FIG. 7B illustrates a workflow named as a workflow 1b that is to be selected for image data of which bibliographic information indicates that delivery source name is Company A and data class is 2. According to the workflow 1b, PDF conversion is performed first, and then delivery-to-folder to a folder for ordering sheets of Company A is performed.

Figure 7C:
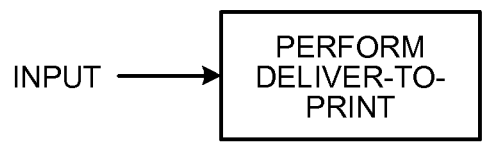

FIG. 7C illustrates a workflow named as a workflow 1c that is to be selected for image data of which data class is 3. According to the workflow 1c, only deliver-to-print is performed. This is because image data of which data class is 3 is monthly sales data in the PDF format. Accordingly, PDF conversion of this data is unnecessary; it is necessary to produce a printout of this data so that the printout is checked and signed by a manager.

Figure 7D:

FIG. 7D illustrates a workflow named as a workflow 1d that is to be selected when data is not image data but a CSV file or the like. According to the workflow 1d, deliver-to-folder to a logging folder which is a location for logging is performed. A log contains date and time of data transmission and reception; date and time of an operation; description about the operation; and description about the data transmitted and received. Logging can be performed by performing deliver-to-folder of bibliographic data and a file to the logging folder and writing them to the folder.

Referring back to FIG. 6, the workflow processing unit 60 determines operations to be performed and an order in which the operations are to be performed from the received workflow name, and processes the file (Step S680). When the operation to be performed is an image conversion operation, the operation can be performed by an image conversion program of the workflow processing apparatus 12. Alternatively, it is possible to request the PC 24 to perform the operation and receive a converted file from the PC 24. When the operation to be performed is a delivery-to-folder operation, it is possible to request to the FTP server 18 or the like to perform the operation. When the operation to be performed is an e-mail delivery operation, it is possible to request the SMTP server 22 to perform the operation. When the operation to be performed is a printing operation, it is possible to request the MFP 14, 16 to perform the operation. When all the operations and requests are completed, process control proceeds to Step S690 to complete processing to be performed by the workflow processing apparatus.

According to an aspect of the embodiment, the configuration that includes the file analyzing unit 74 and the workflow selecting unit 78 is employed. Accordingly, a workflow can be dynamically changed depending on bibliographic data which is a type of a file to be processed and/or the like. Furthermore, neither extension of data to be processed nor provision of a cover page is required because the bibliographic data is determined from a file name. Accordingly, a user can introduce this configuration easily without addition of special means. Executing a workflow can lead to an increase in operating efficiency. Furthermore, the configuration can provide an excellent cost/performance benefit because the workflow can be changed easily and dynamically.

The described embodiments are to be considered in all respects only as illustrative and not restrictive. The embodiment may be embodied in other specific forms including additions, changes, deletions, and other embodiments that will occur to those skilled in the art. It is to be understood that any form of these additions, changes, additions, other embodiments is to be embraced within the scope of the invention so long the effect of the invention is not impaired.

Accordingly, the workflow processing apparatus is not limited to such an independent apparatus as that illustrated in FIG. 1. A configuration in which the MFP 14, 16, the PC 24, or the like can function as the workflow processing apparatus can be employed. A configuration in which the workflow processing apparatus 12 can function as the FTP server 18, the WebDAV server 20, the SMTP server 22, and/or the like can be employed. A configuration in which the workflow processing unit 60 can perform delivery-to-folder, mail delivery, web delivery, and/or the like can be employed.

The workflow processing apparatus is configured to include the file analyzing unit and the workflow selecting unit. Accordingly, the workflow processing apparatus can dynamically change a workflow depending on information, which is the bibliographic data, about a type of the file and/or the like. Meanwhile, a workflow defines one or more operations and an order in which the operations are to be performed. This configuration requires neither extension of data to be processed nor provision of a cover page because the bibliographic data is determined from the file name. Accordingly, a user can introduce this configuration easily without adding specific means. Execution of a workflow can increase operating efficiency. In addition, this configuration can provide an excellent cost/performance benefit by making it possible to change the workflow easily and dynamically.

The bibliographic data can be provided as a file described in a structured language and containing attributes such as creation date and time, a document name, and resolution of the file. Examples of the structured language include eXtensible Markup Language (XML). The file analyzing unit causes the bibliographic data containing the attributes to be stored in the temporary storage area. The workflow selecting unit obtains this bibliographic data and selects a workflow to be executed based on the identifying information in the bibliographic data.

It is possible to configure the operations to be performed by the sections described above as a computer-readable program and provide this program. A computer on which this program is installed can function as the workflow processing apparatus. This program can be provided as being stored in a recording medium such as a flexible disk, a CD-ROM, a DVD, or an SD card or, alternatively, stored in a server apparatus or the like to be provided by downloading. A processing method to be performed by the workflow processing apparatus or to be performed by execution of the program can also be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A workflow processing apparatus connected to a network, the workflow processing apparatus comprising:
   a monitoring unit configured to periodically monitor at least one storage area to determine if data is newly stored in the at least one storage area;
   an obtaining unit configured to obtain the data stored in the at least one storage area upon receiving a notification from the monitoring unit indicating that the data is newly stored;
   an analyzing unit configured to extract bibliographic data from the obtained data, the bibliographical data including at least delivery-source identifying information for identifying a delivery source;
   a workflow selecting unit configured to,
      determine an operation to be performed according to the bibliographic data, and
      select a workflow for performing the determined operation from preset multiple workflows; and
   a workflow processing unit configured to process the obtained data according to the selected workflow.

2. The workflow processing apparatus according to claim 1, wherein the monitoring unit is further configured to poll the at least one storage area to determine whether the data is newly stored in the at least one storage area.

3. The workflow processing apparatus according to claim 1, wherein
the bibliographical data further includes,
data-class identifying information for identifying a data class of the data, and
a type of the data, and
the workflow selecting unit determines the operation to be performed according to the delivery-source identifying information, the data-class identifying information, and the type of the data.

4. The workflow processing apparatus according claim 1, wherein the workflow selecting unit selects the workflow for performing the determined operation from preset multiple workflows associated with at least one storage area.

5. The workflow processing apparatus according to claim 1, wherein the workflow selecting unit determines at least one parameter of the operation.

6. The workflow processing apparatus according claim 5, wherein the at least one parameter includes at least one delivery parameter to deliver the data.

7. A processing method to be performed by a workflow processing apparatus connected to a network, the processing method comprising:
periodically monitoring at least one storage area to determine if data is newly stored in the at least one storage area;
obtaining the data stored in the at least one storage area upon receiving a notification based on the monitoring that the data is newly stored;
extracting bibliographic data from the obtained data, the bibliographical data including at least delivery-source identifying information for identifying a delivery source;
determining an operation to be performed according to the bibliographic data;
selecting a workflow for performing the determined operation from preset multiple workflows; and
processing the obtained data according to the selected Workflow.

8. The processing method according to claim 7, further comprising:
polling the at least one storage area to determine whether the data is newly stored in the at least one storage area.

9. The method according to claim 7, wherein
the bibliographical data further includes,
data-class identifying information for identifying a data class of the data, and
a type of the data, and
the determining determines the operation to be performed according to the delivery-source identifying information, the data-class identifying information, and the type of the data.

10. A non-transitory computer readable medium including a computer program product, the computer program product comprising instructions, which when executed on a computer, causes the computer to implement a workflow processing method for a workflow processing apparatus connected to a network by:
periodically monitoring at least one storage area to determine if data is newly stored in the at least one storage area;
obtaining the data stored in the at least one storage area upon receiving a notification based on the monitoring that the data is newly stored;
extracting bibliographic data from the obtained data, the bibliographical data including at least delivery-source identifying information for identifying a delivery source;
determining an operation to be performed according to the bibliographic data;
selecting a workflow for performing the determined operation from preset multiple workflows; and
processing the obtained data according to the selected workflow.

11. The non-transitory computer-readable medium according to claim 10, wherein the computer program product, when executed on the computer, further causes the computer to perform:
polling the at least one storage area to determine whether the data is newly stored in the at least one storage area.

12. The non-transitory computer-readable medium according to claim 10, wherein
the bibliographical data further includes,
data-class identifying information for identifying a data class of the data, and
a type of the data, and
the determining determines the operation to be performed according to the delivery-source identifying information, the data-class identifying information, and the type of the data.

* * * * *